(No Model.)
I. JOHNSON, R. T. TORKELSON & A. FYRBERG.
REVOLVER.
No. 339,301. Patented Apr. 6, 1886.
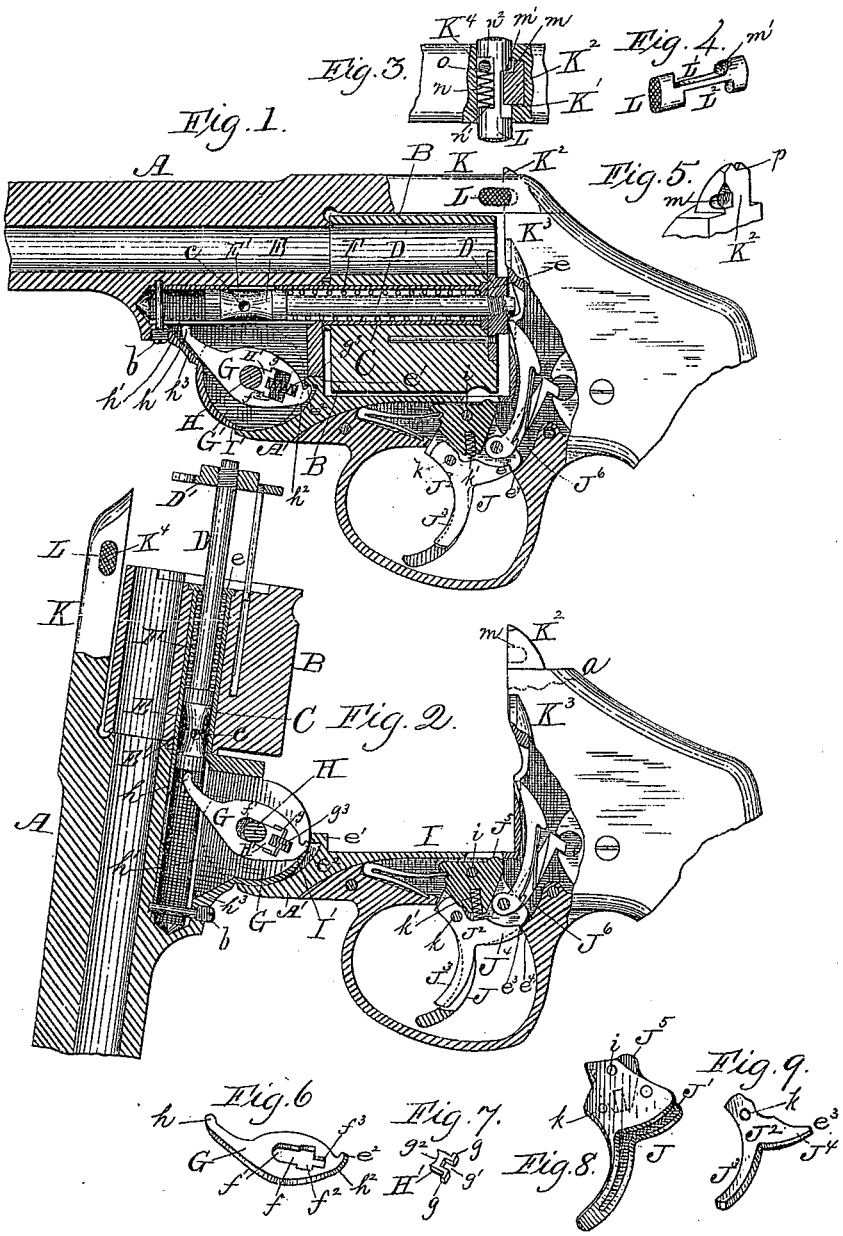
Witnesses;
Inventors;
Iver Johnson
Reinhard T. Torkelson
Andrew Fyrberg

UNITED STATES PATENT OFFICE.

IVER JOHNSON, REINHARD T. TORKELSON, AND ANDREW FYRBERG, OF WORCESTER, MASSACHUSETTS; SAID TORKELSON AND FYRBERG ASSIGNORS TO SAID JOHNSON.

REVOLVER.

SPECIFICATION forming part of Letters Patent No. 339,301, dated April 6, 1886.

Application filed January 4, 1886. Serial No. 187,558. (No model.)

*To all whom it may concern:*

Be it known that we, IVER JOHNSON, REINHARD T. TORKELSON, and ANDREW FYRBERG, all of the city and county of Worcester and Commonwealth of Massachusetts, have invented certain new and useful Improvements in Fire-Arms; and we do hereby declare the following to be a full, clear, and exact description of the same, reference being had to the accompanying drawings and letters of reference marked thereon, forming a part of this specification, and in which—

Figure 1 represents a side view, partly in section and partly in full lines, of so much of a revolving fire-arm as is necessary to illustrate our present invention, as will be hereinafter described. Fig. 2 represents a side view of the same parts shown in Fig. 1, with the trigger, its support, and rear portion of the arm shown in Fig 1 turned down as it appears when the ejector is operated to eject the cartridge-shells. Fig. 3 represents a top view of a portion of the top strap by which the breech and rear part of the arm are locked to the barrel, a portion being broken away, as shown in section, to illustrate the locking devices more fully. Fig. 4 represents a perspective view of the sliding notched locking-piece, as will be hereinafter described. Fig. 5 represents a perspective view of a portion of the breech-piece broken off on dotted line $a$, Fig. 2, and turned around to the right to show its construction more fully. Figs. 6, 7, 8, and 9 represent perspective views of detached parts, as will be hereinafter more fully described.

To enable those skilled in the art to which our invention belongs to make and use the same, we will proceed to describe it more in detail.

In the drawings, the part marked A is the rear portion of the barrel, shown in section.

B is the cylinder, fitted to turn on sleeve C, held in place by means of the screw-pin $b$. Sleeve C also receives and supports the ejector-rod D, and which rod is provided with a spider, D', on the outer end, and with a shoulder or hub part, E, at its other end, the ends of said shoulder part E being made to fit easily the inner surface of the sleeve C, while the center part, E', is turned down in the form of a double cone, with a hole, $c$, in the smaller part, as fully indicated in Figs. 1 and 2 of the drawings.

Against the right-hand end of shoulder part E one end of a spiral spring, F, presses against the inner flange, $e$, of the sleeve C, and the action of spring F is such as to keep the ejector-rod D and its spider D' in their normal positions, as shown in Fig. 1, when not acted upon by the ejector finger or lever G, which is arranged in a slot or chamber, G', in the rear under portion, A', of barrel part A.

Ejector-lever G is provided with a slot, $f$, the upper part, $f'$, being rounded to receive the pivot H, upon which the forearm I turns when lowered to throw out the ejector-rod D and its spider D'. Slot $f$ is enlarged at $f^2$ and contracted at $f^3$ at the bottom, the large part $f^2$ being adapted to receive the flanges $g\,g$ of the cap-piece H', which in turn has a narrow slot, $g'$, at its lower end and a concavity, $g^2$, at its upper end. Concavity $g^2$ fits pivot H, while one end of a small spiral spring, $g^3$, fits in the narrow slot $g'$, the other end of spiral spring $g^3$ fitting in the slot $f^3$ of lever G.

The office of ejector-lever G is to throw out the ejector-rod D, and the operation is as follows: When the forearm I is turned down, lever G turns with it, being forced to turn by the flange or projection $e'$ on the forearm I striking against its lip $e^2$, and as lever G continues to turn its point $h$, passing through a slot, $h'$, in the lower side of the sleeve C, strikes the inner end of the shoulder-piece E and forces out the ejector-rod and its spider, as indicated in Fig. 2, thereby ejecting the cartridge-shells.

I' is a stationary cam, against which the beveled end $h^2$ of lever G strikes, and said lever is pressed up as forearm I is lowered, until its lip $e^2$ has been moved out of contact with projection $e'$, (see Fig. 2,) when the expansive force of spring F throws ejector-rod D and lever G back to their normal positions. (Shown in Fig. 1.)

As forearm I is turned back to the position shown in Fig. 1 projection $e'$ comes in contact with the outer curved surface of lip $e^2$, when spring $g^3$ and yielding lever G moves lengthwise and projection $e'$ is carried or moved beyond lip $e^2$, after which spring $g^3$ forces lever G, so that its lip $e^2$ will again be under projection $e'$. (See Fig. 1.) Flanges $g\,g$ on the cap-piece H' come in contact with shoulders in lever G, thereby preventing cap-piece H' from rising so far as to obstruct the passage of pivot H. The narrow end of lever G coming in contact with the stationary part $h^3$, its back motion is arrested, when it is thrown back by the action of spring F, through ejector-rod D, and also when projection $e'$ strikes the back of lip $e^2$, when the forearm is returned to its locked position, and by which latter operation lever G is forced longitudinally until its lip $e^2$ has passed projection $e'$, when lever G, by the action of spring $g^3$, moves back and its lip $e^2$ enters the pocket under projection $e'$, the latter forming the top thereof.

Trigger J is pivoted at $i$ to the forearm I, and it is also provided with a slot, J', in which the trigger-locking lever $J^2$ is pivoted at $k$, and said locking-lever has a finger-arm, $J^3$, and a locking-arm, $J^4$.

$J^5$ is the cylinder-stop.

From slot J' extends a hole to receive the spiral spring $k'$, the lower end of which spring rests on the locking-arm $J^4$ of trigger-locking lever $J^2$, thereby keeping arm $J^4$ down, as shown in full lines, Fig. 2, and in which position its end $e^3$ will strike against the trigger-guard at $e^4$, thereby locking trigger J, which cannot be moved accidentally or otherwise to fire the arm until arm $J^3$, of trigger-locking lever $J^2$ has been drawn back far enough to elevate the end $e^3$ of its arm $J^4$ above the point $e^4$ of the trigger-guard, as indicated in Fig. 1 of the drawings, after which arm $J^4$ moves with the rear upper part of trigger J up into chamber $J^6$ in firing the arm. By this arrangement accidental firing of the arm is prevented, and that, too, in a simple and convenient manner. The same motion of the finger necessary to fire the arm also unlocks the trigger J; consequently extra motions are avoided.

By interposing cap-piece H' between pivot H and spring $g^3$ a free hole through the movable lever G is always preserved, whereas without the cap-piece if lever G should be removed spring $g^3$ would spring up into the hole previously occupied by pivot H, and the latter could not be conveniently inserted again, while there would be liability of injuring the spring by the operation.

The top strap, K, (shown partly in section in Figs. 1 and 2,) is provided with two slots or openings, said slots intersecting each other at right angles. The vertical slot K' receives the projection $K^2$ (shown in section, Fig. 3) of the breech part $K^3$, connected with forearm I. Projection $K^2$ is provided on its right-hand side with a notch, $m$, to receive the shoulder $m'$ of locking thumb-piece L, which passes through the horizontal slot $K^4$ in the top strap, K.

Thumb locking-piece L is provided with two notches—one, L', to receive projection $K^2$ of the breech part $K^3$, and the other, $L^2$, to receive spiral spring $n$ and holding-pin $o$—and these parts are combined together as follows: Spiral spring $n$ is arranged horizontally in notch $L^2$, with one end resting against one shoulder, $n'$, of thumb-piece L, while the other end presses against holding-pin $o$, inserted in a vertical hole in strap K, so as to stand or abut against shoulder $n^2$ of thumb-piece L, thus holding both spring $n$ and thumb locking-piece L in their proper relative positions, as fully indicated in Fig. 3.

The operation of this part of our invention is as follows: When forearm I is turned up, projection $K^2$ enters the vertical slot K', and, pressing against shoulder $m'$ on thumb-piece L, forces the latter to the right until notch $m$ comes opposite shoulder $m'$ on thumb-piece L, when the latter is forced to the left by the action of spring $n$, thus bringing its shoulder $m'$ into notch $m$ in projection $K^2$ and locking the parts securely together.

To unlock the parts it is only necessary to press locking-piece L to the right far enough to disengage the shoulder $m'$ from notch $m$ in projection $K^2$.

Upon the breech part $K^3$ is constructed the member $K^2$, which extends upward through the strap K and forms the rear sight, $p$, as clearly shown in Fig. 5.

This method of construction is more simple, durable, and less expensive than has been hitherto employed on revolvers constructed upon the breakdown or tilting principle.

We are aware that rear sights have been constructed upon the stationary frame of revolvers, but not on those of the breakdown or tilting principle.

Having described our improvement in fire-arms, what we claim as new and of our invention, and desire to secure by Letters Patent, is—

1. The combination, with the lock mechanism of a fire-arm and firing-trigger hinged to the forearm, of a firing-trigger-locking lever, $J^2$, pivoted in the firing-trigger below the firing-trigger pivot, and spring $k'$, arranged in a hole in the upper part of the firing-trigger, the lower end of said spring pressing down upon the upper edge of arm $J^4$ of trigger-locking lever $J^2$, and in rear of its pivot $k$ in the firing-trigger, substantially as described, and for the purpose set forth.

2. The combination, with ejector-rod D, stationary cam G', and hinged forearm I, provided with projection $e'$, which forms the top of a pocket for the reception of lip $e^2$, of slotted lever G, provided with lip $e^2$, to engage with projection $e'$, pivot H, upon which both forearm I and lever G turn, flanged cap H', to fit the slot in lever G, pivot H, and spring $g^3$, for keeping lip $e^2$ in position to engage with projection $e'$, and movable lever G, to throw out ejector-rod D to eject the cartridge-shells when forearm I is turned down, substantially as described.

3. The combination, with strap K, provided with a transverse slot, $K^4$, and slotted projection $K'$ on breech part $K^3$, of the notched locking thumb-piece L, arranged in transverse slot $K^4$, spring $n$, and holding-pin $o$, substantially as and for the purposes set forth.

IVER JOHNSON.
REINHARD T. TORKELSON.
ANDREW FYRBERG.

Witnesses:
THOS. H. DODGE,
HENRY L. MILLER.